No. 847,333. PATENTED MAR. 19, 1907.
J. P. HAYWARD.
SHAFT COUPLING.
APPLICATION FILED FEB. 8, 1905.
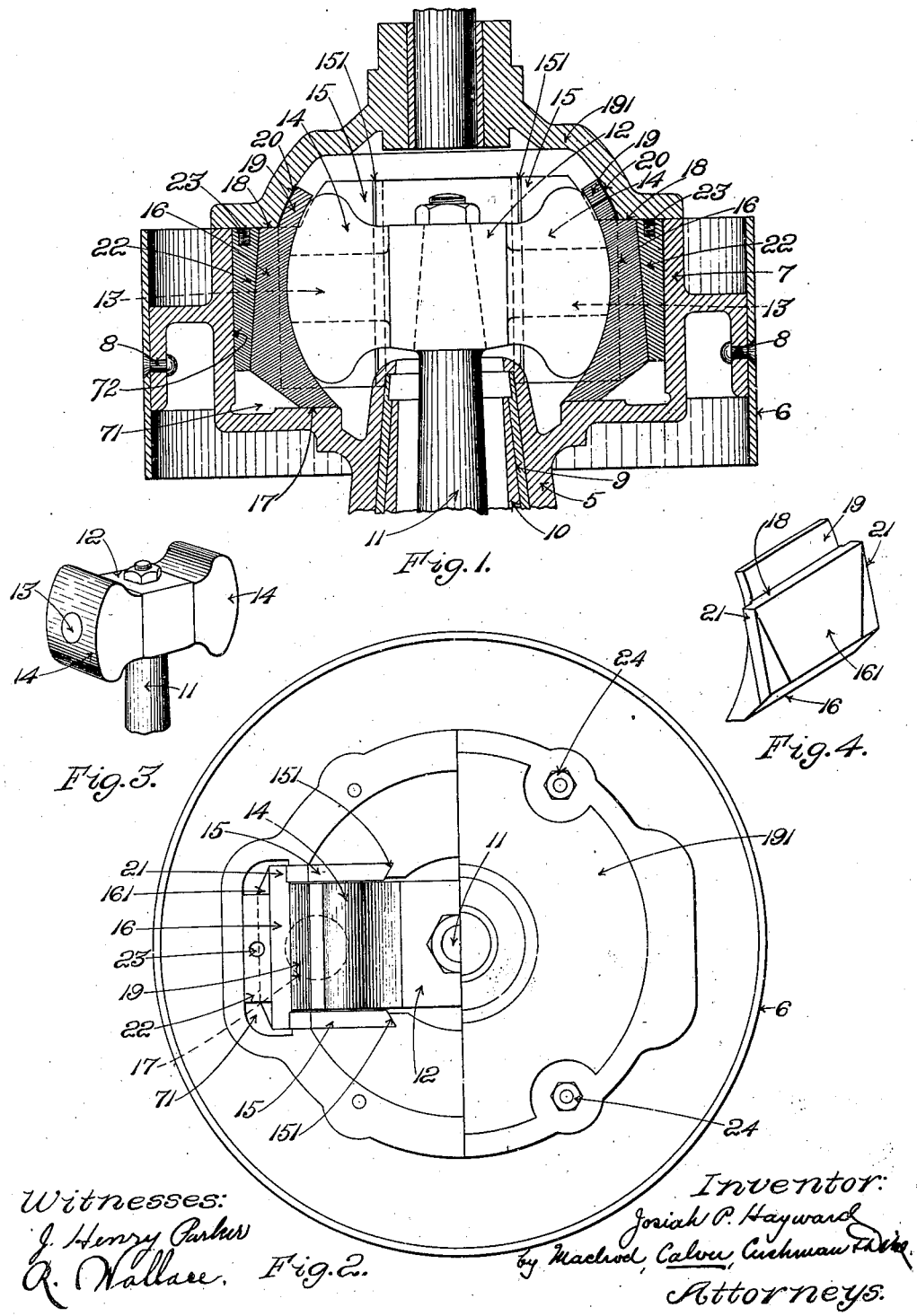
Witnesses:
J. Henry Parker
R. Wallace.
Inventor:
Josiah P. Hayward
by MacLeod, Calver, Cushman & Co.
Attorneys.

UNITED STATES PATENT OFFICE.

JOSIAH P. HAYWARD, OF MALDEN, MASSACHUSETTS, ASSIGNOR, BY MESNE ASSIGNMENTS, TO BRADLEY PULVERIZER COMPANY, OF BOSTON, MASSACHUSETTS, A CORPORATION OF MAINE.

SHAFT-COUPLING.

No. 847,333.

Specification of Letters Patent.

Patented March 19, 1907.

Application filed February 8, 1905. Serial No. 244,733.

*To all whom it may concern:*

Be it known that I, JOSIAH P. HAYWARD, a citizen of the United States, residing at Malden, county of Middlesex, State of Massachusetts, have invented a certain new and useful Improvement in Shaft-Couplings, of which the following is a specification, reference being had therein to the accompanying drawings.

My invention is an improvement upon the device shown in Letters Patent of the United States No. 721,035, granted to Edwin C. Griffin, dated February 7, 1903, for a shaft-coupling. In that patent there is shown a shaft-coupling especially adapted for use in grinding-mills—such, for instance, as is shown in Griffin's prior patent, No. 449,118, dated March 31, 1891, for a grinding-mill, where a very heavy strain is placed upon the universal joint which supports the grinding-roll. In Griffin's patent, No. 721,035, the invention there described is also shown as applied to shafts for power transmission.

My invention has for its object to provide a bearing for certain parts of the universal coupling shown in Griffin's shaft-coupling patent which shall wear less rapidly and which when worn may be more easily replaced. In Griffin's shaft-coupling patent referred to the segmental members, which form a part of the universal coupling, are shown as having Babbitt-metal bearings for their curved wearing-surfaces. My invention provides a more satisfactory bearing to replace this Babbitt metal.

My invention will be readily understood from the following description, taken in connection with the accompanying drawings, and the novel features thereof are pointed out and clearly defined in the claims at the close of this specification.

Referring to the drawings, Figure 1 is a section of the upper portion of a grinding-mill supplied with my improved shaft-coupling bearing. Fig. 2 is a plan view thereof, one-half of the cap being removed for greater clearness. Fig. 3 is a view in perspective of the upper end of the shaft, cross-head, and segmental pieces assembled. Fig. 4 is a view in perspective of the bearing-piece for the segmental member.

In the drawings, referring more particularly to Figs. 1 and 2, the upper portion of the frame-supports is indicated at 5. The rim of the rotating pulley is shown at 6 and the body thereof at 7, the two being attached by rivets 8. The lower part of the said body 7 is formed into a cone-bearing 9, resting upon a corresponding conical surface 10, supported by the frame of the machine. The cone-bearing 9 is shown in the drawings as having a layer of Babbitt metal interposed between it and the corresponding conical surface 10. The body 7 of the pulley is formed with an interior cavity 71, within which the supporting members of the universal coupling are received. These members are the same as shown in the Griffin shaft-coupling patent hereinbefore referred to.

The grinding-roll shaft is shown at 11 and carries on its upper end the cross-head 12, which is provided with trunnions 13. Segmental pieces or members 14 are slipped onto each of the trunnions 13 and are formed with their outer surfaces corresponding to the arc of a circle centered at the center of the cross-head 12. These parts—viz., the shaft, cross-head, trunnions, and segmental pieces—form the movable parts of the driven member, while the pulley-rim 6, body 7, and bearings 9 form the movable parts of the driving member. All of the parts thus far described are the same in function and general construction as in the Griffin patent, No. 721,035, above referred to, and form no part of my present invention, being shown and described here for the sake of clearness.

The movable parts of the driven member are supported in the driving member in the following manner: The central portion of the body 7 is cored out, as before stated, so that it has a central cavity 71, having a cross-section somewhat similar to the central horizontal cross-section of the movable part of the driven member. Vertical side bearings for the segmental pieces 14 are formed in this cavity 71 in the body by means of vertical side pieces 15, (see Fig. 2,) slipped into dovetails 151, cut in the side walls of the cavity 71 in the body 7. These side pieces 15 fit closely against the vertical side surfaces of the segmental member 14 and transmit the turning force from the pulley to the driven shaft.

The curved faces of the segmental members 14 bear against similar faces formed on the movable bearing members 16, (see Fig. 4,) which are shaped to fit into the cavity 71 in the body 7 at right angles with the side pieces 15. These movable bearing members rest upon a seat 17, slightly raised above the lower surface of the cavity 71 for convenience in finishing the parts. The upper part of the movable bearing member 16 is furnished with a shoulder 18, upon which the cover-piece 191, which incloses the coupling, rests. The movable bearing member 16 also extends somewhat above the shoulder 18, as shown at 19, thereby providing an additional bearing-surface for the curved ends of the segmental members 14, and thus allowing the cross-head 12 and segmental members 14 a wider range of movement about the center. I provide a slight clearance 20 between the portion 19 of the movable bearing-piece 18 and the interior surface of the cover 191 to permit suitable adjustment of the movable bearing-piece 16. The movable bearing member 16 is also furnished with wings 21, (see Figs. 2 and 4,) which serve to hold the side pieces 15 closely into the dovetails 151 when pressed into its normal position.

The movable bearing member 16 and the side pieces 15 are held in place by the wedge 22, which for convenience I make slightly shorter than the movable bearing member 16. The said wedge 22 fits between the vertical interior wall 72 of the cavity 71 and an inclined surface 161, formed on the back side of the movable bearing member 16. I provide the wedge 22 with a hole 23, drilled and tapped for the reception of an eyebolt as a means of removing the wedge when desired. The wedge 22 is of such a height that when the movable bearing member 16 is forced into its proper position the upper surface of the wedge 22 is substantially on a level with the shoulder 18 on the movable bearing member 16 and with the upper surface of the body 7, against which surfaces the under face of the cover 19 fits. It will thus be seen that the wedge 22 is held securely in place by the cover 19 when the same is fastened down by the bolts 24. Should the surfaces of the wedge 22 or movable bearing member 15 wear so that the wedge drops down to a lower position, I fill in the space resulting between the upper edge of the wedge and the under face of the cover with shims or liners of any suitable material.

By the construction which I have described I am enabled to replace very quickly the parts of my universal coupling when they become worn, these parts being the side pieces 15, the movable bearing members 16, and the segmental members 14. I also am able to do away with the use of babbitt in these bearings, for I find it convenient to make the pieces referred to of cast-iron, which affords a very satisfactory wearing-surface.

I have shown my invention as applied to the shaft which supports the rotatable grinding-roll of a grinding-mill because that is the form in which my invention has been put into actual use; but it is evident that it may be embodied in a shaft-coupling where it is desired to connect two rotating shafts which may not always be in alinement with each other. The invention may also be embodied in other forms without departing from the spirit of my invention.

What I claim is—

1. In a universal shaft-coupling, the combination with oppositely-located segmental members, of removable bearing-members coöperating with the curved faces of the said segmental members and furnishing the bearing-surface for the curved faces of the said segmental members, and removable side pieces coöperating with the side faces of the said segmental members.

2. In a universal shaft-coupling, the combination with oppositely-located segmental members, of removable bearing members coöperating with the curved faces of the said segmental members, removable side pieces coöperating with the side faces of the said segmental members and holding means for the said bearing-members and side pieces.

3. In a universal shaft-coupling, the combination with oppositely-located segmental members, of removable bearing members coöperating with the curved faces of the said segmental members, removable side pieces coöperating with the side faces of the said segmental members, holding means for the said bearing members and side pieces, and wedges for the said bearing members and side pieces.

4. In a universal shaft-coupling, the combination with a driving member having a cavity therein, and oppositely-located segmental members within the said cavity, of removable bearing members coöperating with the curved faces of the segmental members, and removable side pieces coöperating with the side faces of the said segmental members; dovetailed into the walls of the cavity in the driving member.

In testimony whereof I affix my signature in presence of two witnesses.

JOSIAH P. HAYWARD.

Witnesses:
 GEORGE P. DIKE,
 ROBERT WALLACE.